United States Patent [19]
Kaplan et al.

[11] 3,711,471
[45] Jan. 16, 1973

[54] PURIFICATION OF 6-[D-α-(3-GUANYL-1-UREIDO)PHENYLACETAMIDO]PENICILLANIC ACID

[75] Inventors: Murray A. Kaplan, Syracuse; Alphonse Peter Granatek, Baldwinsville, both of N.Y.

[73] Assignee: Bristol-Myers Company, New York, N.Y.

[22] Filed: Feb. 3, 1971

[21] Appl. No.: 112,452

[52] U.S. Cl. .................................. 260/239.1, 424/271
[51] Int. Cl. ............................................. C07d 99/18
[58] Field of Search ................................... 260/239.1

[56]    References Cited

UNITED STATES PATENTS 3,579,501    5/1971    McGregor .......................... 260/239.1

Primary Examiner—Nicholas S. Rizzo
Attorney—Herbert W. Taylor, Jr., Robert E. Havranek, Richard H. Brink and James Magee, Jr.

[57]    ABSTRACT

6-[D-α-(3-Guanyl-1-ureido)phenylacetamido]penicillanic acid is purified by reaction with nitric acid to form its crystalline nitrate (as a monohydrate) which in turn is converted by reaction with a base to the crystalline zwitterion hemihydrate. The last named is converted to its crystalline potassium salt (dihydrate) and to its crystalline sodium salt (monohydrate).

4 Claims, No Drawings

PURIFICATION OF 6-[D-α-(3-GUANYL-1-UREIDO)PHENYLACETAMIDO]PENICILLANIC ACID

BACKGROUND OF THE INVENTION

1. Field of the Invention

The penicillins of the present invention possess the usual attributes of such compounds and are particularly useful in the treatment of Pseudomonas infections.

2. Description of the Prior Art

The preparation and properties of 6-[D-β-(3-guanyl-1-ureido)phenylacetamido]-penicillanic acid and its salts have been described by my colleague, Donald Neil McGregor, in U.S. Pat. applications Ser. No. 780,557, filed Dec. 2, 1968 and now abandoned and Ser. No. 852,457, filed Aug. 22, 1969, now U.S. Pat. No. 3,579,501, and also described in Belgium Pat. 742,423 (Farmdoc 39,705R) to Bristol-Myers Co.

This compound has the structure

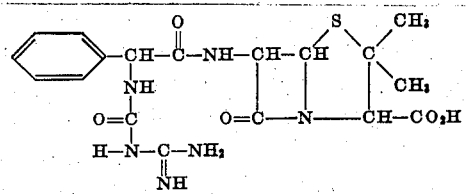

SUMMARY OF THE INVENTION

The present invention provides crystalline 6-[D-α-(3-guanyl-1-ureido)phenylacetamido]-penicillanic acid nitrate monohydrate, crystalline 6[D-α-(3-guanyl-1-ureido)phenylacetamido]-penicillanic acid hemihydrate, crystalline potassium 6-[D-α-(3-guanyl-1-ureido)phenylacetamido]-penicillanate dihydrate and crystalline sodium 6-[D-α-(3-guanyl-1-uredido)phenylacetamido]-penicillanate monohydrate.

The present invention further provides the process of purifying impure, amorphous 6-[D-α-(3-guanyl-1-ureido) phenylacetamido]penicillanic acid which comprises converting crystalline 6-[D-α-(3-guanyl-1-ureido)phenylacetamido]-penicillanic acid nitrate to highly purified crystalline 6-[D-α-(3-guanyl-1-ureido)phenylacetamido]penicillanic acid by slurrying it in aqueous alcohol and then adjusting the pH of said slurry with a base to the range of 4.5 to 6.0 to give a solution from which the purified crystalline 6-[D-α-(3-guanyl-1-ureido)phenylacetamido]penicillanic acid spontaneously soon precipitates and is then collected; and, as a preferred embodiment, the process for purifying impure, amorphous 6-[D-α-(3-guanyl-1-ureido)phenylacetamido]penicillanic acid which comprises converting crystalline 6-[D-α-(3-guanyl-1-ureido)-phenylacetamido]penicillanic acid nitrate monohydrate to highly purified crystalline 6-[D-α-(3-guanyl-1-ureido)phenylacetamido]-penicillanic acid hemihydrate by slurrying it in 50 percent (v/v) aqueous isopropyl alcohol and then adjusting the pH of said slurry with a base to the range of 4.5 to 6.0 to give a solution from which the purified crystalline 6-[D-α-(3guanyl-1-ureido)phenylacetamido]-penicillanic acid hemihydrate spontaneously soon precipitates and is then collected.

The present invention also provides the process of purifying impure, amorphous 6-[D-α-(3-guanyl-1-ureido)phenylacetamido]-penicillanic acid which comprises mixing it with nitric acid in aqueous alcohol at a pH in the range of 1 to 2, recovering the crystalline 6-[D-α-(3-guanyl-1-ureido)phenylacetamido]-penicillanic acid nitrate thus precipitated and then converting said nitrate to highly purified crystalline 6-[D-α-(3-guanyl-1-ureido)- phenylacetamido]penicillanic acid by slurrying it in aqueous alcohol and then adjusting the pH of said slurry with a base to the range of 4.5 to 6.0 to give a solution from which the purified crystalline 6-[D-α-(3-guanyl-1-ureido)phenylacetamido]penicillanic acid spontaneously soon precipitates and is then collected; and as a preferred embodiment, the process for purifying impure, amorphous 6-[D-α-(3-guanyl-1-ureido)phenylacetamido]penicillanic acid which comprises mixing it with nitric acid in 90 percent (v/v) aqueous isopropyl alcohol at a pH in the range of 1.3 to 1.9, recovering the crystalline 6-[D-α-(3-guanyl-1-ureido)phenylacetamido]penicillanic acid nitrate monohydrate thus precipitated and then converting said nitrate to highly purified crystalline 6-[D-α-(3-guanyl-1-ureido)phenylacetamido]-penicillanic acid hemihydrate by slurrying it in 50 percent (v/v) aqueous isopropyl alcohol and then adjusting the pH of said slurry with a base to the range of 4.5 to 6.0 to give a solution from which the purified crystalline 6-[D-α-(3-guanyl-1-ureido)phenylacetamido]penicillanic acid hemihydrate spontaneously soon precipitates and is then collected.

DETAILED DESCRIPTION

As disclosed by Donald Neil McGregor, the starting material used in the process of the present invention is prepared as follows:

N-Guanyl-N'-nitrourea (I)

To a stirred, ice-cooled mixture of 100 ml. of concentrated sulfuric acid and 40 ml. of concentrated nitric acid was added (caution!), in small portions over 40 min., 25 g. (0.3 mole) of cyanoguanidine Eastman. After the addition was complete, the reaction mixture was kept at about 0° for 1.5 hrs. with occasional swirling, then was poured into 1,000 g. of ice. The precipitate was removed by filtration and washed with water. Without drying, the precipitate was suspended in 200 ml. of water and dissolved by the addition of 10 percent aqueous NaOH The resulting solution was filtered, then the product was precipitated by bubbling $CO_2$ through the solution for 1 hour. The solid was removed by filtration, washed with $H_2O$, and dried, yielding 38.6 g. (88 percent), m.p. >250° Anal. Calc'd. for $C_2H_5N_5O_3$: C, 16.3; H, 3.43; N, 47.96.

Found : C, 16.63; H, 3,65; N, 47.6.

4-Guanylsemicarbazide dihydrochloride (II)

A suspension of 5.88 g. (0.04 mole) of N-guanyl-N'-nitrourea in 31.8 ml. of concentrated HCl was cooled by the addition of about 15 g. of ice and storage in an ice bath. The suspension was added over 45 min. to a vigorously stirred, ice-cooled mixture of 12.96 g. (0.18 mole) of zinc dust and about 300 g. of ice. After the addition was completed, the mixture was stored for 10 min. without external cooling and then was filtered. The filtrate was shaken vigorously with 5 ml. (0.05 mole) of benzaldehyde, and the colorless precipitate which separated was quickly removed by filtration and dried under reduced pressure, yielding 3.0 g. of the benzal derivative of II, m.p. 237°.

Without purification, 3.5 g. of the benzal derivative was suspended in 5 ml. of ethanol, then 50 ml. of concentrated HCl was added and the mixture was stored at 40° for 1 hr. The insoluble crystalline product was collected by filtration and recrystallized from water-ethanol, yielding 1.0 g. of II, m.p. 191°.

6-[D(-) -α-(3-Guanyl-1-ureido)-phenylacetamido]-penicillanic acid

To a stirred, ice-salt cooled solution of 1.0 g. (5.25 mmoles) of 4-guanylsemicarbazide dihydrochloride in 6 ml. of $H_2O$ was added a solution of 0.366 g. (5.25 mmoles) of $NaNO_2$ in 1.4 ml. of $H_2O$. Stirring and cooling was continued for 10 min. This solution of guanyl-carbamoylating agent prepared in situ was then added to a stirred, ice-cooled solution of 2.12 g. (5.25 mmoles) of ampicillin trihydrate in 7 ml. of $H_2O$ containing sufficient triethylamine to bring the pH to 7.5. After the solutions were combined, the pH was adjusted to 7.2 with triethylamine, and stirring and cooling was continued for 45 min. The precipitate which separated was collected by filtration, washed with $H_2O$, and dried, yielding 1.2 g. solid 6-[D-α-(3-Guanyl-1-ureido)-phenylacetamido]-penicillanic acid. This was reprecipitated twice by dissolving in 10 ml. of $H_2O$ with triethylamine at pH 9.5, then acidifying of pH 5 (acidification to pH 6.5 is sufficient) with 42 percent $H_3PO_4$, yielding 0.425 g. of 6-[D-α-(3-guanyl-1-ureido)-phenylacetamido]-penicillanic acid, m.p. 198°14 200° C. Dec. Anal. Calc'd. for $C_{18}H_{22}N_6O_5S \cdot H_2O$: C, 45.95; H, 5.57; N, 17.86.

Found: C, 46.65; H, 5.67; N, 17.51.

This material was amorphous and, as will be apparent from the Examples below, was also impure. High purity and crystallinity are highly desirable, if not essential, attributes of commercial penicillins and it was an object of the present invention to provide 6-[D-α-(3-guanyl-1-ureido)phenylacetamido]-penicillanic acid and its sodium and potassium salts in such purity and to provide the necessary processes.

It was discovered, according to the present invention, that impure, amorphous 6-[D-α-(3-guanyl-1-ureido)phenylacetamido]-penicillanic acid is converted to a highly purified nitrate salt or adduct by crystallization from 90 percent V/V isopropanol-water at pH 1–2.0. The nitrate in turn is converted to very pure free acid (zwitterion) by crystallization from 50 percent V/V isopropanol-water at pH 4–6.0. Thus crude amorphous 6-[D-α-(3-guanyl-1-ureido)-phenylacetamido]-penicillanic acid was converted to its purified crystalline nitrate salt in about 75 percent bioyield. The nitrate was converted to the pure (or nearly pure) crystalline zwitterion in about an 86 percent step yield. A change in bio-potency of from 900 to 1,250 u/mgm. and chemical potency of from 600 to 835 u/mgm. was obtained.

It was further discovered, according to the present invention, that crystalline purified 6-[D-α-(3-guanyl-1-ureido)-phenylacetamido]-penicillanic acid hemihydrate is converted to crystalline potassium 6-[D-α-(3-guanyl-1-ureido) phenylacetamido]-penicillanate dihydrate from acetone. This salt is very soluble in water. Dilute water solutions (10 mg./ml.) have a pH of 8.5 and are stable within 10 percent for at least 12 hours at room temperature. Concentrated water solutions (250 mg./ml.) have a pH of 9.8 – 9.9 and are stable within 10 percent for at least 1 hour at room temperature. This salt is also readily soluble at 500 mg./ml. in water (pH 9.9). Thus a crystalline and highly purified potassium 6-[D-α-(3-guanyl-1-ureido)phenylacetamido]-penicillanate dihydrate was prepared in good yield by a water-KOH-acetone or a water-KFH-TEA-acetone procedure from crystalline "free acid" 6-[D-α-(3-guanyl-1-ureido)phenylacetamido]-penicillanic acid hemihydrate. The biological stability of this potassium salt in water is about equal to or equivalent to that of corresponding aqueous solutions of potassium ampicillin.

It was further discovered, according to the present invention, that crystalline purified 6-[D-α-(3-guanyl-1-ureido)-phenylacetamido]penicillanic acid hemihydrate (zwitterion) is converted to crystalline sodium 6-[D-α-(3-guanyl-1-ureido)phenylacetamido] penicillanate monohydrate from acetone. This salt is very soluble in water. Dilute aqueous solutions (10 mg./ml.) exhibit a pH of 8.3 and are stable within 10 percent for at least 24 hours at room temperature. Concentrated aqueous solutions (250 mg./ml.) exhibit a pH of 9.8 – 9.9 and are stable within 10 percent for at least 2 hours at room temperature. This salt is also readily soluble at 500 mg./ml. (pH9.9). Thus, a crystalline and highly purified sodium 6-[D-α-(3-guanyl-1-ureido)phenylacetamido]-penicillanate monohydrate is prepared in good yield by an acetone-water-SEH-TEA procedure from crystalline 6-[D-α-(3-guanyl-1)-phenylacetamido]penicillanic acid hemihydrate. The biological stability of this sodium 6-[D-α-(3-guanyl-1-ureido)phenyl-acetamido]penicillanate monohydrate in water is about equivalent to that of corresponding solutions of sodium ampicillin.

The following examples are given in illustration of, but not in limitation of, the present invention

DESCRIPTION OF THE PREFERRED EMBODIMENTS

Crystallization of 6-[D-α-(3-guanyl-1-ureido)phenyl-acetamido]-penicillanic acid Nitrate Ten grams of amorphous, impure 6-[D-α-(3-guanyl-1-ureido)-phenylacetamido]-penicillanic acid (100 mesh) was slurried in 70–100 ml. of 90 percent (V/V) isopropanol-water. 1 3/10 ml. of concentrated nitric acid (or the volume of $HNO_3$ required to give a pH of 1.3–1.9) was added with very rapid stirring. A solution (pH 1.3–1.9) or near solution was obtained. Crystallization started after seeding in 3 to 5 minutes. The mixture was slurried at ambient room temperature (21°–24° C.) for 1–1.5 hours. The small needle crystals were collected by filtration, washed with 20 ml. of 90 percent isopropanol and then 30 ml. of isopropanol and then vacuum dried over $P_2O_5$ at 50° C. for 24 hours. Yield: 6 grams of 6-[D-α-(3-guanyl-1-ureido)phenylacetamido]-penicillanic acid nitrate monohydrate which was shown to be crystalline by the fact that it exhibited extinction under the polarizing microscope. Comparison of this product with starting material gave the following results:

RESULTS

| | starting material (crude amorphous) | Product (crystalline nitrate monohydrate) |
|---|---|---|
| Estimated Ampicillin | 5–10% | <0.1% |

| Content | | |
|---|---|---|
| Bio-Assay* | 870–920 u/mgm. | 1,000–1,050 u/mgm. |
| Chemical Assay in Ampicillin Units | 590–630 u/mgm. | 700–740 u/mgm. |
| Bio-Yield | -- | 60–76% |
| $[\alpha]_{25}^D$; DMAC | +117, +144 | +180 |
| %H$_2$O, KF (theory for monohydrate = 3.5%) | 5.18% | 2.7% |
| %NO$_3$ (theory = 12.5%) | | on dry basis = 12.2% |
| %N (theory = 19.7%) | | on dry basis = 19.3% |
| %S (theory = 6.42%) | | on dry basis = 6.0% |
| M.P (Capillary) | | 205°–209° C. (d) |

*Using as the standard a certain lot of crude 6-[D-α-(3-guanyl-1-ureido)phenylacetamido]-penicillanic acid which in this particular assay is about one-fourth as active as ampicillin.

EXAMPLE 2

Crystallization of 6-[D-α-(3-guanyl-1-ureido)phenylacetamido]-penicillanic acid hemihydrate (zwitterion or "free acid").

15 grams of crystalline 6-[D-α-(3-guanyl-1-ureido)-phenylacetamido]-penicillanic acid nitrate (100 mesh) was slurried in 100–150 ml. of 50 percent (V/V) isopropanol-water for 5 minutes. 20–40 percent sodium hydroxide (may be replaced by triethylamine) was added with very rapid stirring to a pH of 4.5–6.0. A solution was obtained. (A 10 minute period of fast paper-gravity only filtration may be used if desired.) The mixture was seeded and crystallization started in about 15–20 minutes. The mixture was stirred at ambient room temperature (21°–24° C.) for 2 hours. The small rod-like crystals were collected by filtration, washed with 25 ml. of 50 percent isopropanol, then with 30 ml. of isopropanol and then vacuum dried over P$_2$O$_5$ at 50° C. for 24 hours. Yield: 11.5 grams of 6-[D-α-(3-guanyl-1-ureido)phenylacetamido]penicillanic acid hemihydrate which was shown to be crystalline by the fact that it exhibited extinction under the polarizing microscope. This product was analyzed with the following results:

Estimated Ampicillin Content = <0.1 percent
Bio-Assay* = 1,150–1,210 u/mgm.
Chemical Assay in Ampicillin Units = 800–835 u/mgm.
Bio-Yield = 86 percent
$[\alpha]_{26}^D$; DMAC = +171.6
Percent H$_2$O, KF [Theory for hemihydrate 0.1/2H$_2$O = 2.04 percent] = 2.3 percent
Percent N (Theory, dry = 19.3 percent) = 19.3 percent (dry basis)
Percent S (Theory, dry = 7.36 percent) = 7.6 percent (dry basis)
M.P. = 208°–214° C. (d)
N.M.R. showed no isopropanol present.
*as above in Example 1.

EXAMPLE 3

10 grams of 60 mesh crystalline purified 6-[D-α-(3-guanyl-1-ureido)phenylacetamido]-penicillanic acid hemihydrate prepared according to Example 2 is slurried in a mixture of 10 ml. of water and 50 ml. of acetone. To this suspension is added 4.3 ml. of a 30 percent aqueous solution of potassium hydroxide with rapid stirring. A solution is obtained. (This solution does not crystallize and may be sterilely filtered through suitable filters at positive pressure to remove bacteria and pyrogens. Filtration at this step, if desired, should be completed within 1 hour.) To this solution, 100 ml. of acetone is added over a 3 minute period with rapid stirring. The solution is seeded and crystallization starts in about 3 minutes. The mixture is slurried for 15 minutes. An additional 100 ml. of acetone is added over a three minute period and the mixture is slurried for one hour at ambient room temperature (21°–14° C.). The small, thin, needle-like crystals which form are collected by filtration, washed with 65 ml. of acetone and air dried at 37°–45° C. for 24 hours. Yield: 10 grams of potassium 6-[D-α-(3-guanyl-1-ureido)phenylacetamido]penicillanate dihydrate which was shown to be crystalline by the fact that it exhibited extinction under the polarizing microscope. This product was analyzed with the following results:

RESULTS

Bio-Assay as in Example 1 = 1,100–1,180 units/mgm.
Chemical Assay (as Ampicillin) = 750–790 units/mgm.
Bio-Yield => 95 percent
Estimated Ampicillin content = <0.1 percent
Percent Water, K.F. = 3.6* when dried in vacuo over P$_2$O$_5$ at RT;
  7.1 when air dried at 37–56°; 9.02 percent (after exposure to laboratory air for 24–48 hours)*
Percent Ash as K (dry basis) = 7.6–8.2 (theory = 8.25 percent)
Percent N (dry basis) = 17.9 (theory = 17.8 percent)
S (dry basis) = 6.85 (theory = 6.77 percent)
$[\alpha]_{25}^{25}$; DMAC = +164.3
IR and NMR gave spectra consistent with structure; no free or combined acetone.

EXAMPLE 4

10 grams of 100 mesh crystalline, purified 6-[D-α-(3-guanyl-1-ureido)phenylacetamido]penicillanic acid hemihydrate was slurried in 100 ml. of acetone. Twenty-five ml. of a 28–30 percent solution of potassium 2-ethylhexanoate in methyl isobutyl ketone (KFH-MIBK) was added with rapid stirring. A near solution or solution was obtained in about three minutes. 2 ml. of water was added and a clear solution was obtained in about three minutes (This solution does not crystallize and may be sterilely filtered through suitable filters at positive pressure to remove bacteria and pyrogens. Filtration at this step if desired should be completed within one hour.) 3 (or up to 5) ml. of triethylamine (TEA) was added and the solution was seeded. Crystallization started in about 5–10 minutes. The mixture was slurried at ambient room temperature for 1 hour. The crystals were collected by filtration, washed with 50 ml. of acetone and air dried at 37°–45° C. for 24 hours. Yield: 7.0 grams of potassium 6-[D-α-(3-guanyl-1-ureido)phenylacetamido]-penicillanate dihydrate which was shown to be crystalline by the fact that it exhibited extinction under the polarizing microscope. This product on analysis gave the following results:

RESULTS

Bio-Assay as in Example 1 = 1,100–1,180 units/mgm.
Chemical Assay (as Ampicillin) = 750–790 units/mgm.
Bio-Yield = 70–85 percent
Estimated Ampicillin Content = <0.1 percent
Percent Water, K.F. = 7.2

Percent Ash as K (dry basis) = 7.9 – 8.1 (theory = 8.25 percent)
Percent N (dry basis) = 18.0 (theory = 17.8 percent)
Percent S (dry basis) = 6.83 (theory = 6.78 percent)
$[\alpha]_{25}^{D}$; DMAC = +169.4
IR and NMR gave spectra consistent with structure; no free or combined acetone.

EXAMPLE 5

10 grams of 60 mesh crystalline purified 6-[D-α-(3-guanyl-1-ureido)phenylacetamido]penicillanic acid hemihydrate (zwitterion) prepared according to Example 2 is slurried in 100 ml. of acetone at ambient room temperature (21°–24° C.). 25 ml. of 28–30% solution of sodium 2-ethylhexanoate in methyl isobutyl keystone (SEH-MIBK) is added with rapid stirring. The mixture is slurried for 2 minutes. 5 ml. of water is added and a solution is obtained in about 1 minute. (This solution does not crystallize and may be sterilely filtered at positive pressure through suitable filters to remove particulate matter, bacteria and pyrogens. Filtration at this step if required should be completed within 1.5 hours). 3 (or up to 4) ml. of triethylamine (TEA) is added with rapid stirring. The solution is seeded and crystallization starts in about 3–5 minutes. The mixture is slurried for 15–20 minutes to afford a heavy growth of crystals. 100 ml. of acetone is then added over a 10 minute period with very rapid stirring. The mixture is slurried for 30–45 minutes. The dense microcrystals are removed by filtration, washed with 65 ml. of acetone and air dried at 45° C. for 18–24 hours. Yield: 7–8.5 grams of sodium 6-[D-α-(3-guanyl-1-uriedo)phenylacetamido]penicillanate monohydrate which was shown to be crystalline by the fact that it exhibited extinction under the polarizing microscope. This product on analysis gave the following results:

RESULTS

Bio-Assay as in Example 1 = 1,120 – 1,220 units/mgm.
Bio-Yield = 70 – 85 percent
Chemical Assay (as ampicillin) = 790 – 830 units/mgm.
Estimated Ampicillin Content = <0.1 percent
Percent Water, KF = 3.7 – 3.9 (*Theory for monohydrate = 3.82 percent. This hydrate does not appear to be hydroscope and does not pick up a significant amount of water when exposed to laboratory air for 48 hours.)
Percent Ash as Na (dry basis) = 4.5 – 4.85 (Theory = 5.04 percent)
Percent N (dry basis) = 18 – 18.4 (Theory 18.4 percent)
Percent S (dry basis) = 7.2 – 1 7.6 (Theory = 7.03 percent)
$[\alpha]_{25}^{D}$; DMAC = +176.7
M.P. (10° C./min.) = 218°–220° C. (d)
IR and NMR gave spectra consistent with structure; no free or combined acetone present.

FORMULATIONS

Sodium 6-[D-α-(3-guanyl-1-ureido)phenylacetamido]penicillanate Monohydrate Solution For Parenteral Use (Equivalent to 250 mg./ml. of Anhydrous 6-[D-α-(3-guanyl-1-ureido)phenylacetamido]penicillanic acid).

MANUFACTURING INSTRUCTIONS

The 100 mesh, sterile, pyrogen-free sodium 6-[D-α-(3-guanyl-1-ureido)phenylacetamido]penicillanate monohydrate is filled into sterile vials or disposable-type syringes. The product is reconstituted shortly before use by addition of the indicated amount of sterile, pyrogen-free water.

FORMULA

| | Per Vial |
|---|---|
| Crystalline, Sterile, pyrogen-free Sodium 6-[D-α-(3-guanyl--1-ureido)phenylacetamido]-penicillanate monohydrate, 100 mesh | 0.273 Gram* |
| Amount of sterile, pyrogen-free water required per vial | q.s. 1.0 ml. |

*This weight is the equivalent of 0.25 gram of anhydrous 6-[D-α-(3-guanyl-1-ureido)phenylacetamido]penicillanic acid.

Potassium 6-[D-α-(3-guanyl-1-ureido)phenylacetamido]penicillanate dihydrate Solution for Parenteral Use

MANUFACTURING INSTRUCTIONS

The salt is filled into sterile vials or disposable-type syringes. The product is reconstituted shortly before use by addition of the indicated amount of sterile, pyrogen-free water.

FORMULA

| | Per Vial |
|---|---|
| Crystalline, sterile potassium 6-[D-α-(3-guanyl-1-ureido-phenylacetamdio]penicillanate dihydrate (100 mesh) | 0.294 gms.* |
| Amount of sterile water required to obtain 250 mg./ml. of activity as the "free-acid" (zwitterion) | q.s. 1.0 ml. |

*This weight is equivalent to 0.25 gms. of anhydrous 6-[D-α-(3-guanyl-1-ureido)phenylacetamido]penicillanic acid (called "free acid" or zwitterion).

Large excesses of such basic salts as trisodium citrate, sodium ascorbate, disodium phosphate and sodium acetate failed to solubilize 6-[D-α-(3-guanyl-1-ureiod)phenylacetamido]penicillanic acid at a concentration greater than 50 mg./ml. in water. It was discovered, however, that trisodium phosphate and sodium carbonate did solubilize 6-[D-α-(3-guanyl-1-ureido)phenylacetamido]-penicillanic acid in water at concentrations greater than 250 mgm./ml. (pH 9.–9.4). The solutions showed stabilities similar to that of sodium ampicillin at the same concentrations. Dry-fill mixtures of 6[D-α-(3-guanyl-1-ureido)phenylacetamido]penicillanic acid ("free acid," zwitterion) and sodium carbonate or trisodium phosphate are useful I.V. and I.M. dosage forms. Specific examples follow.

Solution for Parenteral Use of 6-[D-α-(3-guanyl-1-ureido)-phenylacetamdio]penicillanic acid hemihydrate with Sodium Carbonate (Dose: 250 mg./ml.)

MANUFACTURING INSTRUCTIONS

1. The sterile 200 mesh sodium carbonate and the sterile 200 mesh crystalline 6-[D-α-(3-guanyl-1-ureido)phenylacetamido]-penicillanic acid hemihydrate are mixed in a suitable sterile blender for 1 hour and then milled or screened to assure break up of any lumps.

2. The sterile mixture above is filled into sterile vials or disposable-type syringes. The product is reconstituted shortly before use by addition of the indicated amount of sterile, pyrogen-free water.

FORMULA

| | Per Vial |
|---|---|
| Crystalline, 6-[D-α-(3-guanyl-1-ureido)phenylacetamido]-penicillanic acid hemihydrate (200 mesh), Sterile and Pyrogen Free | 0.25 grams |
| Sodium Carbonate, (200 mesh), Sterile and Pyrogen Free | *0.07 grams |
| Volume of Sterile, Pyrogen-Free Water required to obtain 250 mgm./ml. | **0.78 ml. |

*The amount of Sodium Carbonate required may vary as to the minimum amount required to give a pH of 9.3–9.8 and/or a complete solution.

**The 250 mg./ml. solution is stable within 10 percent for at least 1 hour at room temperature. This solution may be diluted to a 100 mg./ml. solution which is stable within 10 percent for at least 2 hours at room temperature, or a 10 mg./ml. solution which is stable within 10 percent for at least 24 hours at room temperature. The 250 mgm./ml. is equivalent to 250,000 units/ml.

Solution for Parenteral Use of 6-[D-α-(3-guanyl-1-ureido)phenylacetamido]penicillanic acid hemihydrate with Trisodium Phosphate (Dose: 100 mg./ml.)

MANUFACTURING INSTRUCTIONS

1. The sterile, pyrogen-free 100 mesh 6-[D-α-(3-guanyl-1-ureido)phenylacetamido]penicillanic acid hemihydrate and the sterile, pyrogen-free 100 mesh trisodium phosphate are mixed in a suitable sterile blender for one hour and then milled or screened sterilely to remove any lumps.

2. The above mixture is filled into sterile vials or disposable type syringes. The product is reconstituted shortly before use by addition of the indicated amount of sterile, pyrogen-free water.

FORMULA

| | Per Vial |
|---|---|
| Crystalline 6-[D-α-(3-guanyl-1-ureido)phenylacetamido]-penicillanic acid hemihydrate, 100 mesh, sterile, pyrogen-free | 0.1 grams |
| Trisodium phosphate, 100 mesh, sterile, pyrogen-free anhydrous | 0.041 grams* |
| Volume of water required to give 100 mg./ml. | 0.9 ml.** |

*The amount of trisodium phosphate required is the minimum amount to give a solution at pH 9.3 – 9.7.

**This solution is stable within 10 percent for at least 2 hours and may be diluted to a 10 mg./ml. solution which is stable for at least 24 hours at room temperature.

We claim:

1. Crystalline 6-[D-α-(3-guanyl-1-ureido)phenylacetamido]-penicillanic acid nitrate.

2. Crystalline 6-[D-α-(3-guanyl-1-ureido)phenylacetamido]-penicillanic acid nitrate monohydrate.

3. The process of purifying impure, amorphous 6-[D-α-(3-guanyl-1-ureido)phenylacetamido]penicillanic acid which comprises mixing it with nitric acid in aqueous alcohol at a pH in the range of one to two, recovering the crystalline 6-[D-α-(3-guanyl-1-ureido)phenylacetamido]penicillanic acid nitrate thus precipitated and then converting said nitrate to highly purified crystalline 6-[D-α-(3-guanyl-1-ureido)-phenylacetamido]penicillanic acid by slurrying it in aqueous alcohol and then adjusting the pH of said slurry with a base to the range of 4.5 to 6.0 to give a solution from which the purified crystalline 6-[D-α-(3-guanyl-1-ureido)phenylacetamido]penicillanic acid spontaneously soon precipitates and is then collected.

4. The process of claim 8 for purifying impure, amorphous 6-[D-α-(3-guanyl-1-ureido)phenylacetamido]penicillanic acid which comprises mixing it with nitric acid in 90 percent (v/v) aqueous isopropyl alcohol at a pH in the range of 1.3 to 1.9, recovering the crystalline 6-[D-α-(3-guanyl-1-ureido)phenylacetamido]penicillanic acid nitrate monohydrate thus precipitated and then converting said nitrate to highly purified crystalline 6-[D-α-(3-guanyl-1-ureido)phenylacetamido]penicillanic acid hemihydrate by slurrying it in 50 percent (v/v) aqueous isopropyl alcohol and then adjusting the pH of said slurry with a base to the range of 4.5 to 6.0 to give a solution from which the purified crystalline 6-[D-α-(3-guanyl-1-ureido)phenylacetamido]penicillanic acid hemihydrate spontaneously soon precipitates and is then collected.

* * * * *